UNITED STATES PATENT OFFICE.

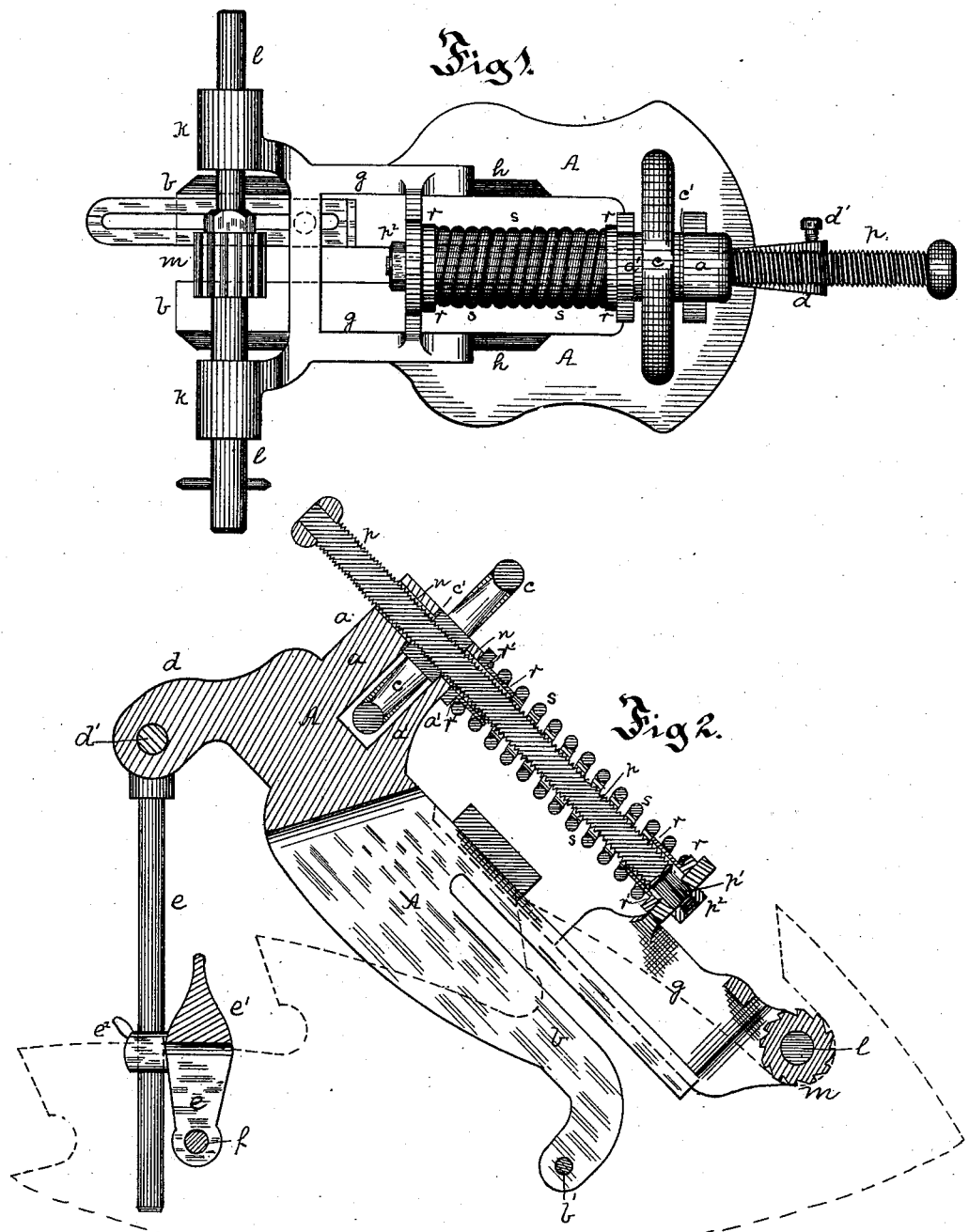

HENRY IHSEN, OF ALLEGHENY CITY, ASSIGNOR, BY MESNE ASSIGNMENTS, TO R. L. ORR AND COMPANY, (LIMITED,) OF PITTSBURG, PENNSYLVANIA.

SAW-GUMMER.

SPECIFICATION forming part of Letters Patent No. 301,996, dated July 15, 1884.

Application filed July 10, 1883. (No model.)

*To all whom it may concern:*

Be it known that I, HENRY IHSEN, of Allegheny City, in the county of Allegheny and State of Pennsylvania, have invented new and useful Improvements in Saw-Gummers; and I do hereby declare the following to be a full, clear, and exact description thereof.

My invention relates to apparatus employed for gumming or cutting a throat in the teeth of saws, generally termed a "saw-gummer," and relates specially to that class of saw-gummers which clamp or otherwise are secured to the saw, and cut the throat or gullet by means of a burr or milling-tool mounted on an arbor or shaft journaled in the machine, having special reference to certain improvements on the saw-gummers patented by Joseph M. Smith, August 17, 1875, and February 27, 1877. Its object is to simplify the construction of these machines, and thus to render them more efficient and less expensive.

It consists, essentially, in so forming the saw-gummer composed of a gummer-frame arranged to be attached to the saw and having two stationary arms or bearings, a sliding cutter-carriage, a screw-rod, and a feeding-wheel that the square end of the screw-rod shall fit into a square mortise in the upright of a sliding cutter-carriage, and the coiled spring shall be interposed upon the screw-rod between the upright on the sliding cutter-carriage and the inner upright of the stationary frame, the cutter-carriage being advanced and restricted on the gummer-frame by means of the hand or feeding wheel in gumming the saw and withdrawing the cutter.

It also consists in certain improvements in the method of securing the spring on the gummer, by means of which an ordinary spiral may be employed.

In the drawings, Figure 1 is a top view of my improved gummer, and Fig. 2 is a longitudinal section showing a portion of the saw in dotted lines to illustrate its operation.

Like letters of reference indicate like parts in each.

The gummer-frame A is generally formed of cast metal, and is provided with the clamping-arms $b$, through a threaded hole in one of which the clamping-screw $b'$ passes, and by means of which the forward part of the gummer is secured to the saw. At the back of the frame is the tail $d$, to which the tail-rod $e$ is pivoted, the faces of the tail and tail-rod being roughened or notched, so that by tightening up the screw $d'$ the tail-rod may be rigidly secured to the frame. Sliding on the tail-rod is the sliding rest or tail-clamp $e'$, which has a slit within which the saw fits, and a set-screw, $f$, to clamp it to the saw, the rest $e'$ being adjusted on the tail-rod by the set-screw $e^2$. The cutter-carriage $g$ is mounted on slides $h$ on the frame A, and is advanced and retracted on the frame in gumming the saw, as hereinafter described. At the end of the cutter-carriage are the bearings $k$, in which the shaft or arbor $l$, carrying the cutter $m$, is journaled. These parts are of the usual or any approved construction.

At the rear of the frame A are the stationary arms $a\ a'$, which are usually cast with the frame, and which have the plain bores $n$ extending through them, through which arms the screw-rod $p$ passes, the rod being held from turning in the cutter-carriage by means of the square or angular part $p'$, fitting into a like-shaped hole in the cutter-carriage, and the nut $p^2$, screwed on the end of the rod to secure it to the carriage. The rod has a slight longitudinal play in the angular hole of the carriage, for the purpose hereinafter referred to.

Fitting around the screw-rod $p$, between the stationary arms $a\ a'$, is the internally-threaded hand-wheel $c$, which turns on the rod $p$, and thus feeds it forward and back through the arms $a\ a'$, the feeding of the gummer being regulated by this hand-wheel. As the pressure of the machine is carried through the screw-rod and hand-wheel against the rear arm, $a$, a washer, $c'$, is placed between this arm $a$ and the hand-wheel to overcome the friction.

Fitting loosely around the screw-rod $p$ are the thimbles $r$, one resting against the arm $a'$ and one against the cutter-carriage, these thimbles being provided with annular shoulders $r'$. Between these thimbles the spring $s$ is confined around the screw-rod $p$, the ends of the spring resting around the thimbles against the shoulders $r'$. The spring is thus only confined by the ends, so that it can turn freely around the screw, and can twist when compressed, if it has a tendency thereto, and can exert a direct pressure upon the cutter-carriage. This spring pressing against the carriage takes up the longitudinal play of the rod $p$, and thus acts as a cushion in case the pressure against the cutter is too great.

The operation of the gummer is as follows: Before placing the gummer upon the saw, by turning the hand-wheel the cutter-carriage is drawn back as far as the spring will allow it, the spring being thus compressed, as shown in Fig. 1. The gummer is then placed on the saw, the cutter resting on the back of the tooth that is to be gummed, and by means of the tail-rod $d$ and sliding rest or tail-clamp $c'$ the gummer is set at the angle the cut is to be made. The clamping-screws $b'$, $c^2$, and $f$ are then tightened up, and the gummer thus firmly secured on the saw. The cutter $m$ is then rotated by means of a crank catching on the shaft or arbor $l$, and at the same time the hand-wheel $c$ is turned slowly to feed the cutter forward, so that it cuts into the tooth, and thus forms the gullet.

On account of the sliding play of the rod within the carriage it is not necessary to turn the hand-wheel continuously, as it may be given a slight turn, and thus free the rod, so that the carriage will be fed forward by the spring for the distance of the play of the rod within the carriage. As soon as the tooth is gummed as deep as desired, the operator stops feeding the cutter, and rotates the cutter until it stops cutting and runs freely, and the gullet is thus finished smooth, square, and true. The cutter should be fed slowly, a very slight turn of the hand-wheel feeding the screw-rod forward as fast as necessary. As the feeding-screw is held from turning in the cutter-carriage by the square or angular part $p'$, a positive feed is obtained, and there is no opportunity for the carriage to wabble, and thus make a wavy cut. By means of suitable guide-pieces the movement of the cutter-carriage may be limited, so that the same cut is made in each tooth. To move the gummer to the next tooth the carriage is drawn back by means of the hand-wheel to tighten up the spring, and the clamping-screws $b'$ and $f$ are loosened and the gummer lifted off, and, without altering the adjustment, placed upon the saw, so that the cutter rests against the back of the next tooth to be gummed, and the operation is repeated, each tooth being thus gummed at the same angle and to the same depth.

The machine is simple and strong in construction, and therefore not liable to get out of order. Its operation is positive, and it requires but little power to operate it, and it can be manufactured much more cheaply than the gummers now in use.

What I claim as my invention, and desire to secure by Letters Patent, is—

1. In saw-gumming machines composed of a gummer-frame, a sliding cutter-carriage, a feeding-wheel, a screw-rod, and a coiled spring, the screw-rod having a square end fitting into a squared mortise in the upright of the sliding cutter-carriage, and the interposed coiled spring upon the screw-rod between the upright on the sliding frame and the inner part of the stationary frame, substantially as and for the purposes set forth.

2. In a saw-gummer, the combination, with a gummer-frame, sliding cutter-carriage, and feeding screw-rod, of thimbles fitting around said rod and a spring fitting over and confined between said thimbles, substantially as set forth.

In testimony whereof I, the said HENRY IHSEN, have hereunto set my hand.

HENRY IHSEN.

Witnesses:
R. L. ORR,
JAMES I. KAY.